United States Patent
Khan et al.

(10) Patent No.: US 11,238,181 B2
(45) Date of Patent: Feb. 1, 2022

(54) PRODUCTION CONSOLE AUTHORIZATION PERMISSIONS

(71) Applicant: Roku, Inc., Los Gatos, CA (US)

(72) Inventors: Muhammad Israr Khan, Santa Clara, CA (US); Gary Franklin Ellison, San Mateo, CA (US); Wing C. Lee, Cupertino, CA (US)

(73) Assignee: Roku, Inc., San Jose, CA (US)

( * ) Notice: Subject to any disclaimer, the term of this patent is extended or adjusted under 35 U.S.C. 154(b) by 424 days.

(21) Appl. No.: 15/896,369

(22) Filed: Feb. 14, 2018

(65) Prior Publication Data

US 2019/0251297 A1 Aug. 15, 2019

(51) Int. Cl.
*G06F 21/71* (2013.01)
*G06F 21/62* (2013.01)
*G06F 21/44* (2013.01)
*G06F 21/57* (2013.01)
*G06F 8/65* (2018.01)
(Continued)

(52) U.S. Cl.
CPC ............... *G06F 21/71* (2013.01); *G06F 8/65* (2013.01); *G06F 21/44* (2013.01); *G06F 21/572* (2013.01); *G06F 21/6218* (2013.01); *H04L 9/3213* (2013.01); *G06F 21/604* (2013.01); *G06F 2221/2141* (2013.01)

(58) Field of Classification Search
CPC ...................................................... G06F 21/71
See application file for complete search history.

(56) References Cited

U.S. PATENT DOCUMENTS

| 7,665,127 | B1 | 2/2010 | Rao et al. | |
|---|---|---|---|---|
| 2014/0153441 | A1* | 6/2014 | Frey | H04L 49/354 370/255 |
| 2015/0121070 | A1 | 4/2015 | Lau et al. | |

(Continued)

FOREIGN PATENT DOCUMENTS

JP 2016-009466 A 1/2016

OTHER PUBLICATIONS

Extended European Search Report for European Application No. 19753853.1, dated Sep. 24, 2021.

*Primary Examiner* — Shin-Hon (Eric) Chen
*Assistant Examiner* — Jessica J South
(74) *Attorney, Agent, or Firm* — Sterne, Kessler, Goldstein & Fox P.L.L.C.

(57) ABSTRACT

Disclosed herein are system, method, and computer program product embodiments for enabling access to a firmware-locked function of a secure device. A secure device may be production hardware that has locked certain functions not available for public use. In an embodiment, the secure device may receive a request to access a firmware-locked function. The request may include an authorization token that includes an identifier specific to the particular secure device. Based on the receipt of the authorization token, the secure device may retrieve authorization data from the firmware memory of the secure device to determine whether the provided authorization token matches the firmware authorization data. In an embodiment, the secure device may also utilize channel information for authentication purposes. Using the authorization token and/or channel information, the secure device may determine whether to grant access to the firmware-locked function.

20 Claims, 5 Drawing Sheets

(51) Int. Cl.
*H04L 9/32* (2006.01)
*G06F 21/60* (2013.01)

(56) References Cited

U.S. PATENT DOCUMENTS

| | | | |
|---|---|---|---|
| 2015/0324578 A1* | 11/2015 | Bhooshan | H04L 63/08 |
| | | | 726/7 |
| 2017/0180135 A1* | 6/2017 | Hodroj | G06F 8/654 |
| 2017/0223005 A1 | 8/2017 | Birgisson et al. | |
| 2018/0108008 A1* | 4/2018 | Chumbley | G06Q 20/3674 |
| 2019/0097785 A1* | 3/2019 | Elenes | H04L 9/002 |

\* cited by examiner

PRODUCTION CONSOLE AUTHORIZATION PERMISSIONS

FIELD

This disclosure is generally directed to managing access to firmware-locked functions in secure devices.

BACKGROUND

During the production and manufacturing of computing devices, engineers and manufacturers will sometimes manipulate or test production hardware and software to ensure that the hardware and software operate as intended. Engineers and manufacturers may interact with the production hardware in a state ready for consumers. For example, rather than interacting with a prototype of a computing device, engineers and manufacturers may interact with a production version of the computing device. In some instances, technicians may interact with production hardware during the production process, such as, for example, during a quality assurance process. In other instances, technicians may interact with production hardware to solve customer identified problems after a customer has indicated that the production hardware is broken. In another instance, engineers may utilize production hardware and software to develop and/or test new software features or applications to be implemented on the production hardware.

While technicians may manipulate this production hardware, access to firmware stored in these computing devices is often difficult to attain. In some instances, firmware access may be blocked entirely. For example, production devices may block access to firmware or firmware features for security purposes, such as, for example, to prevent tampering, hacking, or reverse engineering. When individuals authorized to access the firmware and/or firmware features attempt to gain access, however, the individuals face difficulties because the production hardware has been finalized and secured to prevent firmware access. Further, the proprietor of the production hardware may partner with other developers to develop features for the hardware. It is often difficult for proprietors to selectively grant and/or manage permissions for these partners once the production hardware has been secured and certain features have been locked by the firmware.

BRIEF SUMMARY

Provided herein are system, apparatus, device, method and/or computer program product embodiments, and/or combinations and sub-combinations thereof, for granting access to firmware-locked functions in a secure device.

In an embodiment, a secure device may be a computing device that includes a firmware architecture. The secure device may range from a general purpose computer to application specific hardware or an application specific device. For example, the secure device may be a mobile phone, a tablet computer, a laptop computer, a television, a streaming media device, a media player device, a gaming console, an Internet service device such as a router or modem, an Internet of Things (IoT) device, a clock, a wearable electronic device such as a smart watch, a printer, a scanner, and/or other devices that include firmware. In an embodiment, the firmware for a secure device may be stored in non-volatile memory. A user without specific permissions may not be able to access or modify the firmware. In an embodiment, the firmware restricts particular application functions of the secure device. While users may be able to utilize the secure device on a consumer level or application software level, general users may be unable to access firmware-locked functions of the secure device.

In an embodiment, a manufacturer of the secure device may have disabled functions of the secure device when producing the secure device. Disabling these function may prevent consumers from tampering with, hacking, and/or reverse engineering the secure device. When producing consumer level secure production devices, manufacturers may utilize the firmware to enable and/or disable specific functions of the secure device. At times, however, proprietors of the secure device may wish to grant access to certain firmware-locked functions. For example, proprietors may wish to allow technicians to access fault information stored in flash memory to debug problems or errors associated with the secure device. Similarly, proprietors may wish to allow technicians to manipulate low level hardware functions of the secure device for debugging problems, testing for quality assurance purposes, and/or for developing new functions for the secure device. In an embodiment, proprietors may permit technicians to update firmware software and/or application software stored in the secure device.

In an embodiment, proprietors may also wish to allow certain partner individuals to access these firmware-locked functions. For example, if a third party is developing a software application for the secure device, the proprietor may permit the third party to utilize firmware-locked functions for testing purposes. In an embodiment, the proprietor may deliver the physical secure device to the third party. In an embodiment, the secure device may be a consumer-level device that includes firmware-locked functions. While the proprietor may allow the third party to access some of the firmware-locked functions, the proprietor may wish to prevent the third party from accessing others. For example, the third party may be developing an application that utilizes a microphone and/or voice recording functions of the secure device. Based on this knowledge, the proprietor may allow utilization of the microphone without granting permission to utilize a camera located on the secure device. In an embodiment, the firmware of the secure device may restrict the usage of the microphone to a particular usage while the third party may wish to utilize the microphone in a different manner. In an embodiment, the third party may wish to install new software updates on the secure device.

In these cases, in an embodiment, the secure device may execute a process to allow a technician and/or a third party to access the firmware-locked functions of a secure device. Even if the secure device has been finalized for production on a consumer level, a technician and/or third party may be able to access the firmware-locked functions. In an embodiment, to facilitate this access, the secure system may utilize authorization tokens and corresponding identification information stored in the firmware of the secure device. By utilizing an authorization token, the secure system is able to ensure that specific individuals and/or systems are able to access the firmware-locked functions of the secure device. In this manner, the secure device may still limit access to general consumers or users of the secure device, granting access to only the individuals authorized to access the firmware-locked functions. Using authorization tokens provides a secure process for accessing firmware-locked functions of a finalized production level secure device. Authorization tokens also allow proprietors to avoid manufacturing unsecured and/or unlocked devices for the purpose of testing.

In an embodiment, the authorization token may be a data structure and/or data object that includes a unique identifier. In an embodiment, the secure device may be configured to accept certain authorization tokens and not others. For example, in an embodiment, a secure device may accept only one specific authorization token. In this manner, the authorization token may be tied to a specific secure device. In an embodiment, the authorization token configured to allow access to firmware-locked functions of a first secure device may not allow access to firmware-locked functions of a second secure device. In this manner, the authorization token may not be generally applicable to all secure devices. Proprietors may utilize this configuration to control access to secure devices and/or to ensure that users with a particular authorization token will not be able to access all secure devices.

In an embodiment, a user who has been granted an authorization token may supply the authorization token to the secure device in an attempt to obtain access to the firmware-locked functions. In an embodiment, the user may supply the authorization token to the secure device via a physical connection. For example, the user may utilize a computer with a hardwire connection to the secure device. In an embodiment, the user may wirelessly transmit the authorization token to the secure device.

After receiving the authorization token, the secure device may initiate a firmware check protocol to determine if the unique identifier supplied in the authorization token matches the identification information stored in the firmware. For example, to initiate this firmware check protocol, the secure device may initiate a boot mode start-up process so that the secure device initializes using the firmware and/or does not load an operating system or application software The secure device may determine if the unique identifier matches the identification information. In an embodiment, the secure device may correspond to a single authorization token such that even if another authorization token is provided, the secure device will not grant access to firmware-locked functions. In an embodiment, to perform this determination, the authorization token may include identification information related to a person that has been assigned the authorization token, a particular computing system authorized to utilize the authorization token, an identifier associated with the secure device (e.g., a serial number of the secure device), a channel identifier, and/or other unique information that may distinguish the relationship between the authorization token and the secure device from other authorization tokens and secure devices. In an embodiment, based on a comparison of the unique identifier provided in the authorization token to the identification information stored in the firmware of the secure device, the secure device may determine whether to provide access to the firmware-locked functions.

In an embodiment, a computing system remote from the secure device may provide an authorization token via a channel. In an embodiment, a channel may be an identifier of a source of access to the secure device. For example, the secure device may maintain a list of channels. In an embodiment, the list of channels may correspond to content providers that provide content and/or software functionality to the secure system. For example, a first channel may correspond to a first content provider that supplies video content to the secure device. A second channel may correspond to a second content provider that supplies electronic book content to the secure device. In an embodiment, the secure device is configured to detect an access request from the first content provider or second content provider based on the channel utilized to access the secure device. For example, the secure device may expose a first application programming interface (API) to the first content provider. In this manner, when the first content provider interacts with the secure device using the first API, the secure device may recognize the usage of the first API as the usage of the first channel and/or recognize that the source of the interaction is the first content provider.

In an embodiment, the secure device may utilize the channel information to determine whether a requesting device is authorized to access a firmware-locked function. In an embodiment, the secure device may utilize this channel information in conjunction with information stored in the authorization token. For example, the secure device may grant access to the firmware-locked function if it receives a particular authorization token having a particular identification and the authorization token is received over a particular channel. In an embodiment, if one of these conditions is not met, the secure device may deny access to the firmware-locked function.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for granting access to firmware-locked functions in a secure device. These features will now be discussed with respect to the corresponding figures.

Figure 1:
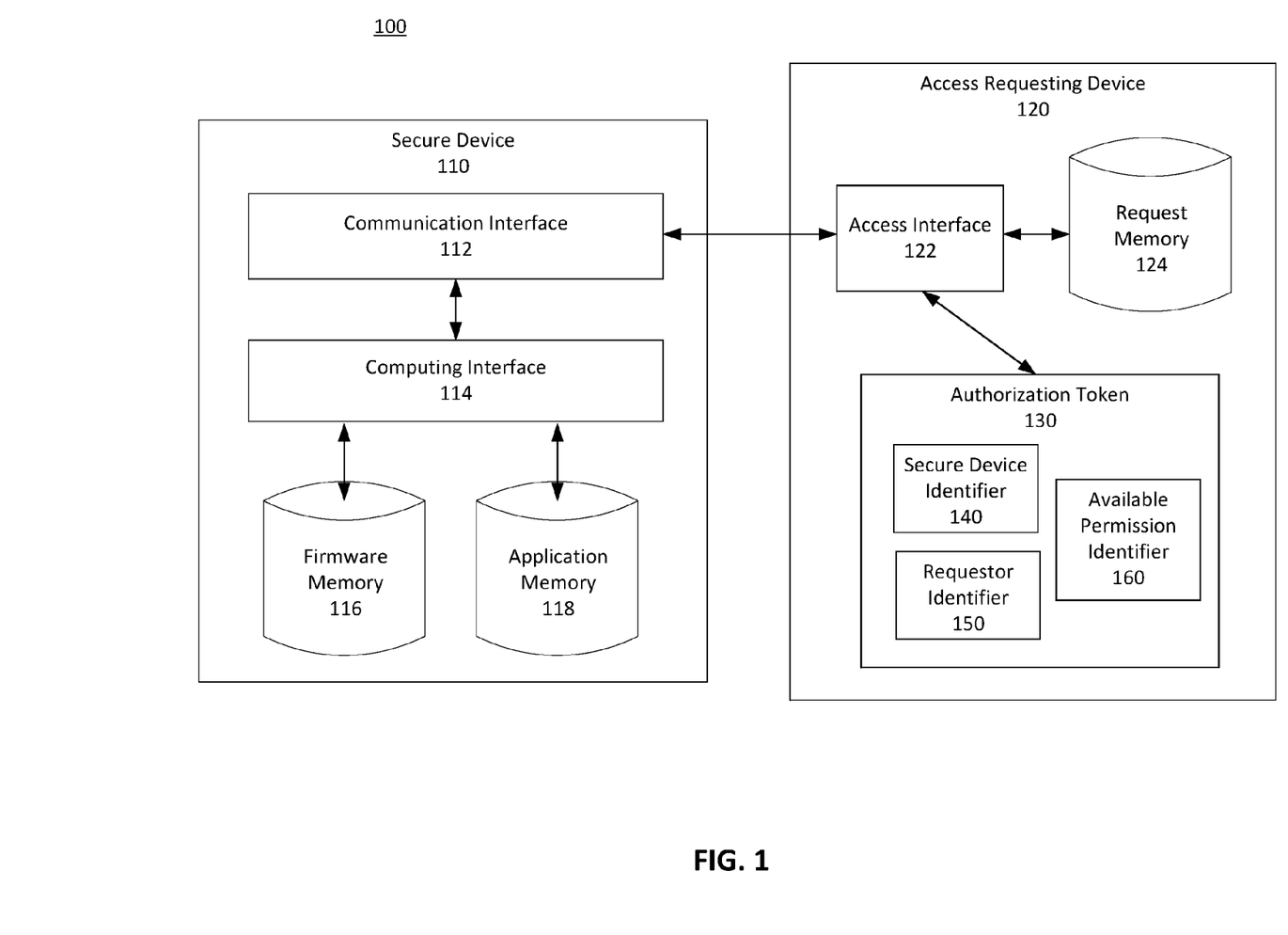
FIG. 1 depicts a block diagram of a secure device access environment, according to some embodiments.

FIG. 1 depicts a block diagram of a secure device access environment 100, according to some embodiments. In an embodiment, the secure device access environment 100 may include a secure device 110 and an access requesting device 120. Secure device 110 may be a computing device that includes a firmware architecture. Secure device 110 may range from a general purpose computer to application specific hardware or an application specific device. For example, secure device 110 may be a mobile phone, a tablet computer, a laptop computer, a television, a streaming media device, a media player device, a gaming console, an Internet service device such as a router or modem, an Internet of Things (IoT) device, a clock, a camera, a wearable electronic device such as a smart watch, a printer, a scanner, and/or other devices that include firmware.

In an embodiment, secure device 110 may include one or more processors, memory, servers, routers, modems, antennae, input and/or output interfaces, hardware connectors, such as for example, Universal Serial Bus connectors, ports, and/or other communication hardware configured to communicate with access requesting device 120. Based on the applications, functions, and/or design of secure device 110, secure device 110 may include various hardware components to implement the desired functionality.

In an embodiment, secure device 110 may include firmware memory 116. Firmware memory 116 may include volatile and/or non-volatile memory, such as read-only memory (ROM), erasable programmable read-only memory (EPROM), and/or flash memory. Firmware memory 116 may store low-level instructions and/or programs utilize to operate secure device 110. For example, firmware memory 116 may provide an operating environment for other software programs and/or may provide an operating system to be utilized by secure device 110. Firmware memory 116 may provide a basic input/output system (BIOS) and/or provide other hardware initialization processes for booting runtime services for operating systems and/or programs.

Different configurations of secure device 110 may utilize different firmware programs stored in firmware memory 116. For example, for secure device 110 embodiments requiring less complex computing functionality, firmware memory 116 may not include functionality to support additionally application program functionality. In other embodiments where secure device 110 utilizes a more complex computing configuration, firmware memory 116 may include more complex firmware programs configured to support and/or service application programs.

To illustrate, in an embodiment, secure device 110 may be remote control device used to send commands to a television or a wireless streaming system. If secure device 110 is limited in functions (e.g., limited to the transmission of commands), the firmware program stored in firmware memory 116 may be less extensive compared to other types of secure devices 110. For example, if secure device 110 is a smart watch configured to measure data from biometric sensors, process the measured data, display the measured data using a graphical user interface, and/or communicate with a remote computing system via a wireless communication interface, the firmware program stored in firmware memory 116 may be more complex.

In an embodiment, while the complexity of the firmware program may vary, a common feature among different types of secure devices 110 may be that the firmware program and/or the firmware memory 116 may be inaccessible to users of secure device 110. For example, secure device 110 may be production hardware that may grant access to application programs and/or application software but may not grant access to the firmware program and/or firmware memory 116. In an embodiment, firmware programs may be more sensitive than applications programs because access to firmware programs may grant access to locked functions of secure device 110. For example, a user or system with access to the firmware program may read sensitive information stored in secure device 110, control the functions of secure device 110, and/or load malicious programs onto secure device 110. Similarly, a user or system may hack, tamper with, and/or reverse engineer programs stored in secure device 110 via firmware program access.

Due to the sensitive nature of programs stored in firmware memory 116, proprietors and/or manufacturers may wish to restrict access to firmware memory 116. In an embodiment, the proprietors may wish to grant limited access to select authorized individuals and/or systems, allowing access to firmware memory 116. For example, proprietors may wish to allow technicians to access fault information stored in firmware memory 116 to debug problems or errors associated with secure device 110. Similarly, proprietors may wish to allow technicians to manipulate low level hardware functions of secure device 110 for debugging problems, testing for quality assurance purposes, and/or for developing new functions and/or programs for the secure device 110. In an embodiment, proprietors may wish to allow technicians to update firmware software and/or application software stored in the secure device 110.

In an embodiment, proprietors may also wish to allow certain partner individuals to access these firmware-locked functions. For example, if a third party is developing a software application for the secure device, the proprietor may wish to allow the third party to utilize firmware-locked functions for testing purposes.

Figure 3:
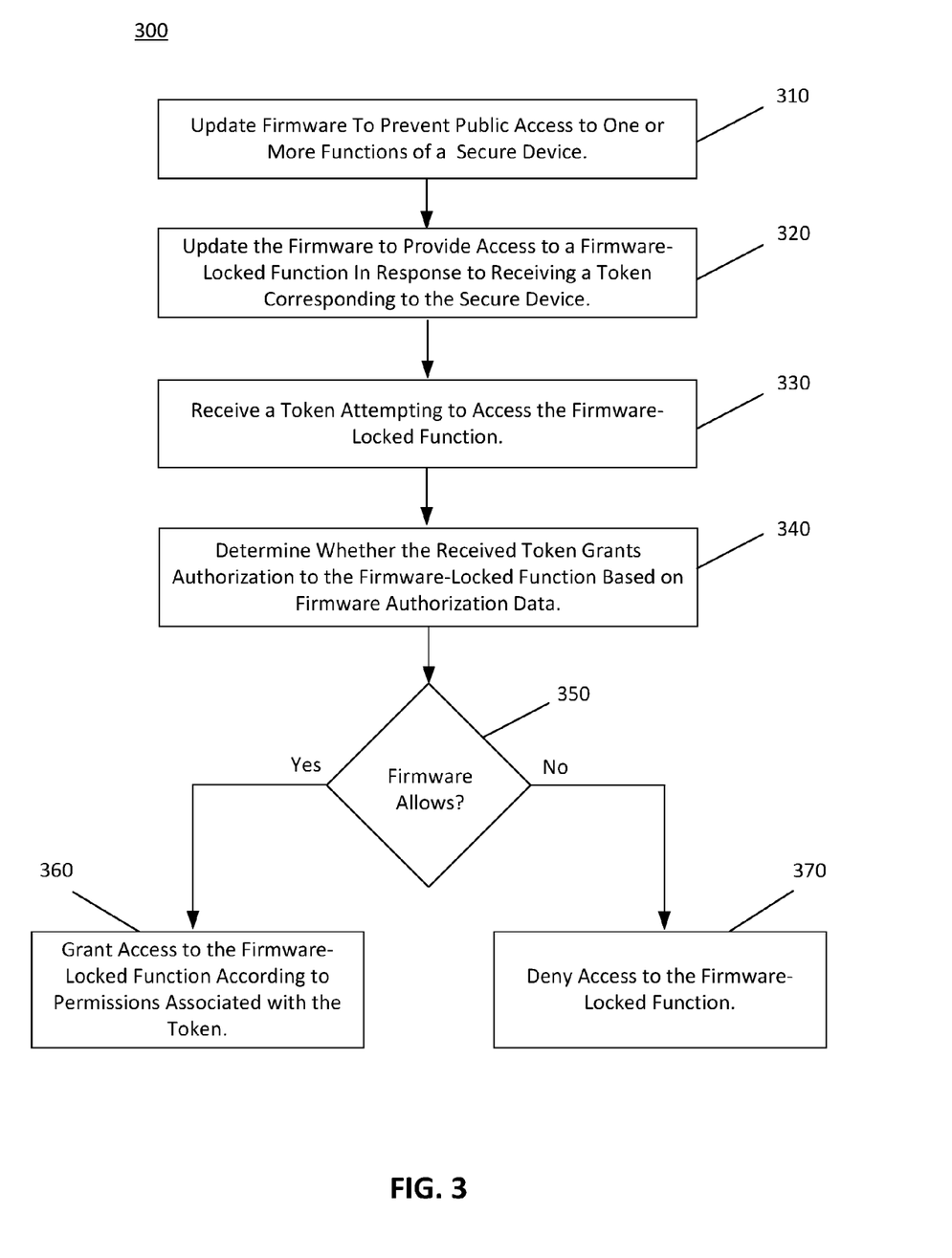
FIG. 3 depicts a flowchart illustrating a method for accessing a secure device, according to some embodiments.
Figure 4:
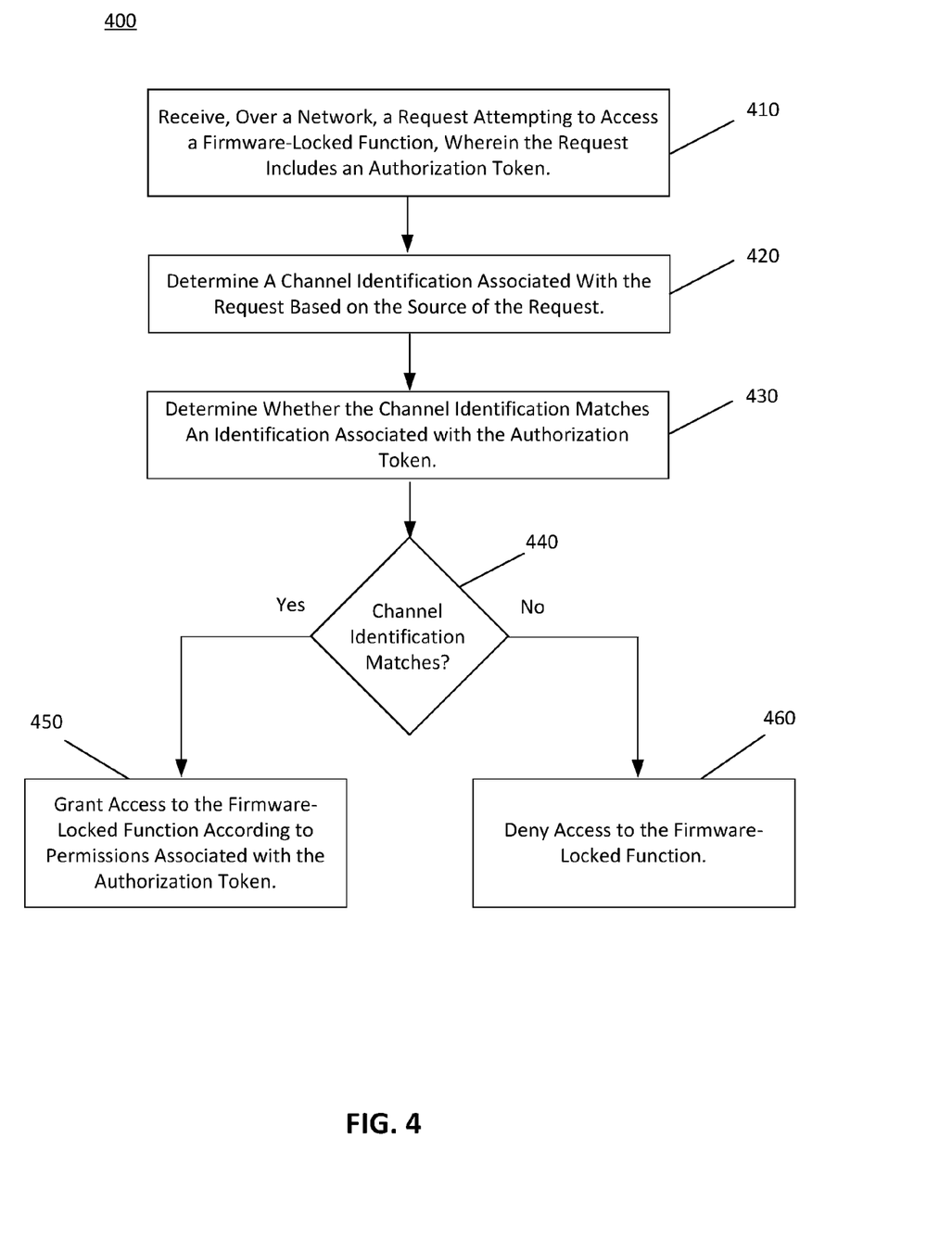
FIG. 4 depicts a flowchart illustrating a method for accessing a secure device via a channel, according to some embodiments.

In an embodiment, to allow certain individuals and/or systems to access firmware-locked functions, secure device 110 may utilize authorization tokens 130. In an embodiment, access requesting device 120 may provide authorization token 130 to secure device 110 in an attempt to access firmware-locked functions. FIG. 3 and FIG. 4 (discussed below) provide example embodiments of how this authorization may occur. In an embodiment, when secure device 110 receives an authorization token 130 from access requesting device 120, secure device 110 may check for identification information stored in firmware memory 116. If the identification information matches an identifier included in authorization token 130, secure device 110 may grant access to access requesting device 120 to access the firmware-locked functions.

In an embodiment, firmware-locked functions may include access to the firmware program. For example, access may include being able to read the firmware program and/or modify the firmware program. In an embodiment, a firmware-locked function may relate to hardware functionality provided by secure device 110. For example, secure device 110 may implement a wireless communication device configured to send and/or receive wireless communications at a specific frequency. Secure device 110 may utilize this specific frequency in a finalized production level implementation although the hardware components may be able to transmit and/or receive wireless communications at different frequencies. The firmware program stored in firmware memory 116 may dictate the usage of this frequency, locking the usage of other frequencies. In an embodiment, if secure device 110 receives an authorization token that grants permissions to utilize different frequencies, secure device 110 may grant access to a requesting system such as access requesting device 120 to control the wireless communication device. This control may allow access requesting device 120 to utilize other previously firmware-locked frequencies.

In an embodiment, firmware-locked functions may also include application program functions that may be locked on an application level. In an embodiment, an application program is a program accessible to users of secure device 110. In an embodiment, a user may access an application program without providing additional special permissions or authorizations to secure device 110. While a user or consumer may be able to access the application program, the firmware program may disable certain application program functions depending on the design of secure device 110. Disabling application program functions may occur, for example, when the functions have not been fully developed, when functions are available to certain applications but not others, when certain applications act as an intermediary between the firmware and the user application (e.g., a device driver), and/or when firmware designates software functions and/or content as hidden from a user. In an embodiment, the firmware may control which functions associated with secure device 110 are locked.

To illustrate a firmware-locked function related to an application program, secure device 110 may execute a graphics rendering service for certain applications. If a device external to secure device 110 or a restricted application within secure device 110 attempts to access the graphics rendering service, secure device 110 may recognize that the device and/or restricted application are not authorized and prevent access to the graphics rendering service. For example, programming stored in firmware memory 116 may allow a first application to utilize the graphics rendering service to display a video on a display screen attached to secure device 110. While secure device 110 may host other applications, these applications may not be able to display videos.

In an embodiment, while firmware may restrict and/or lock certain hardware and/or software functions of secure device 110, a proprietor of secure device 110 may wish to provide some access to these firmware-locked functions. As previously discussed, providing access to firmware-locked functions may aid in the troubleshooting or debugging of errors encountered by secure device 110 and/or may aid in the development of functions or applications for secure device 110.

In an embodiment, an access requesting device 120 may request access to a firmware-locked function through the use of an authorization token 130. To illustrate a process of obtaining access, in an embodiment, a secure device 110 may include a communication interface 112, a computing interface 114, firmware memory 116 and/or application memory 118.

As previously discussed, firmware memory 116 may be non-volatile memory storing firmware utilized to enable hardware and/or software functions of secure device 110. In an embodiment, firmware memory 116 may include authorization data. The authorization data may include a token identifier that indicates which tokens may grant access to a firmware-locked function. In an embodiment, the authorization data may be a list of acceptable tokens. In an embodiment, the token identifier may be an entry in the list that includes characteristics of acceptable tokens. For example, when secure device 110 receives a token, secure device 110 may compare attributes of the received token to the one or more token identifiers included in the list. If an attribute of the received token matches a token identifier, secure device 110 may grant access to the firmware-locked function. A token may be a data object created for and/or provided by a computing system external to secure device 110.

In an embodiment, the token identifier may be an identifying characteristic related to secure device 110. For example, secure device 110 may be associated with a serial number to distinguish a particular secure device 110 from other secure devices 110. The token identifier may be this specific serial number. When secure device 110 receives a token, secure device 110 may check the authorization data stored in firmware memory 116 to determine if the token includes the serial number as an identifier. If so, secure device 110 may grant access to the device requesting access and/or providing the token to secure device 110. In an embodiment, the token identifier and/or information stored on the token may include user identification, requestor information, an encrypted passcode and/or signature unique to secure device 110, a firmware access command to command secure device 110 to access firmware memory, other identifiers resistant to spoofing, and/or permissions available to the holder of the token.

To receive a token, secure device 110 may utilize communication interface 112. Communication interface 112 may include a connection port, a cable connector, a wireless signal receiver and/or transmitter, communication circuitry, and/or other components that may facilitate communication between secure device 110 and access requesting device 120. Similarly, access interface 122 of access requesting device 120 may include similar components to allow wired and/or wireless communication between secure device 110 and access requesting device 120.

In an embodiment, access requesting device 120 may supply authorization token 130 to secure device 110. Access requesting device 120 may transmit authorization token 130 using access interface 122 to communication interface 112. Authorization token 130 may have been stored in request memory 124. Access interface 122 may have retrieved authorization token 130 from request memory 124 to transmit to communication interface 112. Communication interface 112 may transmit authorization token 130 to computing interface 114 to process authorization token 130 to determine whether authorization token 130 includes identification information sufficient to access a firmware-locked function. Computing interface 114 may comprise one or more processors configured to retrieve authorization data from firmware memory 116 in response receiving an access request from access requesting device 120. Computing interface 114 may compare information included in authorization token 130 with authorization data stored in firmware memory 116. Based on this comparison, computing interface 114 may determine whether to grant access to the firmware-locked function.

In an embodiment, authorization token 130 may by a data object or data element passed from access requesting device 120 to secure device 110. In an embodiment, for example, authorization token 130 may include a structure similar to a JSON Web Token. In an embodiment, authorization token 130 may include secure device identifier 140, requestor identifier 150, and/or available permission 160. Secure device identifier MO may be an identifier specific to a particular secure device 110. In an embodiment, secure device identifier 140 may distinguish a particular secure device 110 among other secure devices 110. For example, secure device identifier 140 may include a serial number specific to the secure device 110 that will grant access to an access requesting device 120 that is providing the particular authorization token 130. Secure device identifier 140 may include encoded data. This encoded data may include identifiers associated with secure device 110, such as, for example, a secure device 110 firmware version identifier, a firmware build date, and/or time limits indicating time periods when secure device 110 will provide access upon receipt of authorization token 130. In an embodiment, authorization token 130 may include a signature. The signature may be signed using a public and/or private key and may aid in authenticating access requesting device 120 and/or in demonstrating that tampering with authorization token 130 has not occurred.

In an embodiment, authorization token 130 may include requestor identifier 150. In an embodiment, requestor identifier 150 may be an identification related to an access requesting device 120 and/or a user using access requesting device 120. For example, requestor identifier 150 may be an identification that a user has been properly authenticated at access requesting device 120, such as, for example, via a username and/or password authentication process. Access requesting device 120 may submit this user identification information as a requestor identifier 150 in authorization token 130. In this manner, secure device 110 may utilize this information in conjunction with the authorization data stored in firmware memory 116 to determine whether to grant access to access requesting device 120. In an embodiment, requestor identifier 150 may include information related to access requesting device 120. For example, requestor identifier 150 may include a serial number and/or key code associated with access requesting device 120. In an embodiment, secure device 110 may store this serial number and/or key code in firmware memory 116. When secure device 110 receives authorization token 130, computing interface 114 may determine whether the requestor identifier 150 is stored in firmware memory 116.

In an embodiment, authorization token 130 may include an available permission identifier 160. Available permission identifier 160 may include an indication of which firmware-locked functions that secure device 110 should allow in response to receipt of authorization token 130. For example, after authentication and/or authorization based on authorization data stored in firmware memory, secure device 110 may utilize available permission identifier 160 to determine one or more firmware-locked functions to unlock for use by access requesting device 120. In an embodiment, available permission identifier 160 and/or authorization token 130 may be encrypted in a manner that computing interface 114 is able to decrypt. Upon decryption and authentication, secure device 110 may grant access to the firmware-locked functions.

In an embodiment, authorization token 130 may not include available permission identifier 160. Instead, secure device 110 may determine which firmware-locked functions to unlock in response to authenticating authorization token 130 using authorization data stored in firmware memory 116. For example, firmware memory 116 may store and/or map available permissions to token identifiers stored in the authorization data. In this manner, when secure device identifier 140 and/or requestor identifier 140 are found to match authorization data stored in firmware memory 116, secure device 110 is able to identify which firmware-locked functions to unlock based on a mapping of permissions in firmware memory 116. In this manner, due to the mapping in firmware memory 116 between token identifiers and permissions, authorization token 130 may not include available permission identifier 160.

In an embodiment, in addition to performing an analysis of authorization token 130 to determine whether to grant access to a firmware-locked function, computing interface 114 may access application memory 118. Application memory 118 may include volatile and/or non-volatile memory and/or data storage and retrieval circuits configured to store application programs. Application programs stored in application memory 118 may vary in complexity based on the design of secure device 110. In an embodiment, computing interface 114 may retrieve an application program from application memory 118 and/or execute the application program after initially loading an operating environment using a firmware program stored in firmware memory 116. In this manner, computing interface 114 may control the execution of application programs in accordance with instructions stored in firmware memory 116. In an embodiment, computing interface 114 may also facilitate user inputs and/or outputs as well as communications between secure device 110 and access requesting device 120. When a firmware-locked function is made accessible to access requesting device 120, computing interface 114 may facilitate interactions between access requesting device 120 and the firmware-locked function on secure device 110.

After obtaining access to firmware-locked functions, access requesting device 120 may interact with secure device 110 in the manner allowed based on permissions granted. In an embodiment, access requesting device 120 may allow a user to interact with the firmware-locked function. For example, access requesting device 120 may be a computing device with a display screen that allows a user to view and/or manipulate data within secure device 110. In an embodiment, users may interact with secure device 110 to troubleshoot or debug problems and/or to develop new programs and/or functionality for use on secure device 110. Real-time manipulation may aid in these efforts. In an embodiment, presenting authorization token 130 may allow a user to access a low level development console in secure device 110. In an embodiment, request memory 124 may include instructions that execute after secure device 110 has granted permission to access the firmware-locked function. For example, request memory 124 may include scripts utilized for troubleshooting, debugging, or software development. In an embodiment, a script may execute from request memory 124 to access a list of faults or flags stored in firmware memory 116. The execution of this script may cause access requesting device 120 to retrieve this information and/or organize the retrieved information in a manner specified in the instructions.

In an embodiment, request memory 124 may include a program loading script configured to load new features, software programs, and/or operating systems onto secure device 110. This program loading script may cause access requesting device 120 to upload new programs into application memory 118. Computing interface 114 may then execute these new programs. In an embodiment, request memory 124 may include scripts to also test the functionality of newly uploaded programs. In an embodiment, access requesting device 120 may even alter information stored in firmware memory 116 depending on the permissions granted by the proprietor. For example, a user may be able to modify the operating system of secure device 110 based on the authentication of an authorization token 130. In this manner, via the use of an authorization token 130 specific to a secure device 110, an access requesting device 120 is able to access firmware-locked functions of the secure device 110 that may otherwise be unavailable due to the secure production level state of secure device 110.

Figure 2:
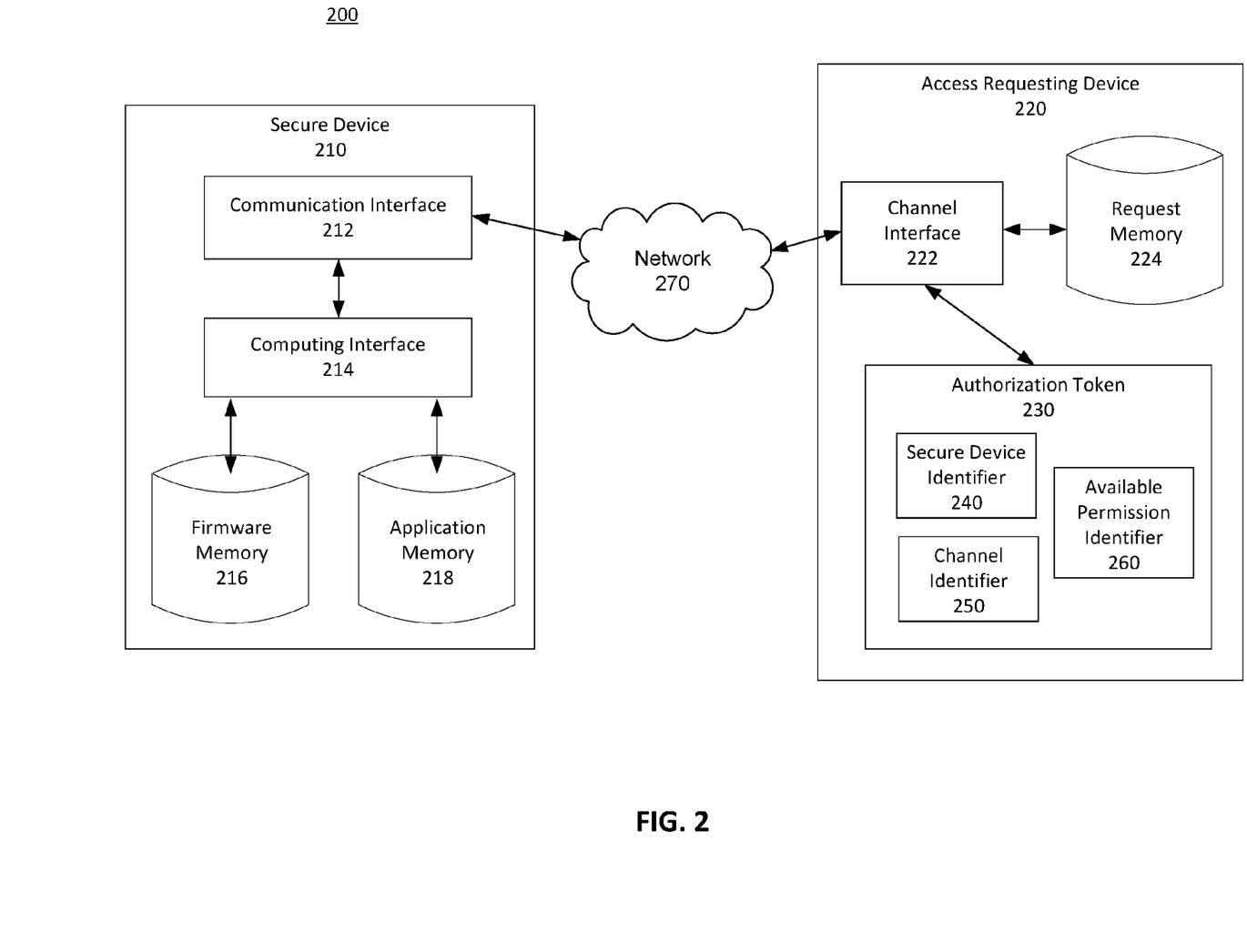
FIG. 2 depicts a block diagram of a secure device channel access environment, according to some embodiments.

FIG. 2 depicts a block diagram of a secure device channel access environment 200, according to some embodiments. In an embodiment, secure device channel access environment 200 may operate in a manner similar to secure device access environment 100 as described with reference to FIG. 1. For example, access requesting device 220 may submit authorization token 230 to secure device 210 in order to gain access to a firmware-locked function. Secure device 210 may include communication interface 212, computing interface 214, firmware memory 216, and/or application memory 218. The components of secure device 210 may operate in a manner similar to the components of secure device 110.

Access requesting device 220 may operate in a manner similar to access requesting device 120. In an embodiment, components such as request memory 224, authorization token 230, secure device identifier 240, and available permission identifier 260 may operate in a manner similar to their corresponding components described with reference to FIG. 1.

In an embodiment, access requesting device 220 may utilize channel interface 222 to communicated with communication interface 212. In an embodiment, channel interface 222 may communicate with secure device 210 via network 270. In an embodiment, authorization token 230 may include a channel identifier 250. Access requesting device 220 may communicate with secure device 210 via network 270 and/or a network protocol to send and receive data over network 270. Network 270 may be a network capable of transmitting information either in a wired or wireless manner and may be, for example, the Internet, a Local Area Network (LAN), or a Wide Area Network (WAN). The network protocol may be, for example, a hypertext transfer protocol (HTTP), a TCP/IP protocol, User Datagram Protocol (UDP), Ethernet, cellular, Bluetooth, or an asynchronous transfer mode, and/or a combination of the listed protocols.

In an embodiment, access requesting device 220 may utilize a channel to communicate with secure device 210. For example, access requesting device 220 may deliver authorization token 230 via the channel. In an embodiment, from the perspective of secure device 210, a channel may be a source identifier indicative of the source of a communication received at secure device 210. For example, secure device 210 may maintain a list of channels, storing this list in either firmware memory 216 and/or application memory 218. The list of channels may correspond to content providers and/or systems that communicate with secure device 210.

For example, a first channel may correspond to a first content provider that supplies video content to secure device 210. A second channel may correspond to a second content provider that supplies electronic book content to secure device 210. In an embodiment, secure device 210 is configured to detect an access request from the first content provider or second content provider based on the channel utilized to access secure device 210. For example, secure device 210 may expose a first application programming interface (API) to the first content provider. In this manner, when the first content provider interacts with secure device 210 using the first API, secure device 210 may recognize the usage of the first API as a communication from the first channel and/or recognize that the source of the interaction is the first content provider.

In an embodiment, access requesting device 220 may provide authorization token 230 via a channel assigned to access requesting device 220. Firmware memory 216 may store a channel identification for recognizing the source of requests. For example, firmware memory 216 may assign a channel identification (e.g., a number 100) to requests received from access requesting device 220. Secure device 210 may be able to detect the source of the requests independent of the presence of channel identifier 250 in an authorization token 230. For example, secure device 210 may utilize an API configuration as described above. In an embodiment, secure device 210 may use namespaces to organize channels. Secure device 210 may utilize namespaces to organize content providers such that each channel identification associated with each content provider is different.

By assigning different channels to different content providers, even if a second content provider steals an authorization token 230 from a first content provider, the second content provider will not be able to utilize the authorization token 230 based on the channel assignment. Because the second content provider will utilize a second channel and will not have access to the first channel, secure device 210 will recognize an error when it receives authorization token 230 over the second channel. Based on the channel mappings stored in firmware memory 216, to grant access to a firmware-locked function, secure device 210 will have expected to receive authorization token 230 over the first channel. Based on this mismatch, secure device 210 may deny access to the firmware-locked function.

Similarly, if a random user or malicious entity obtains authorization token 230, the entity will not have access to the first channel to provide authorization token 230 to secure device 210. In this manner, channel identifications may add another layer of security to ensure that no other entities but authorized individuals are able to access the firmware-locked functions of secure device 210. In an embodiment, using channel information in conjunction with secure device identifier 240 stored in authorization token 230 may allow for a two-tiered security process. For example, secure device 210 may grant access the firmware-locked function if it receives a particular authorization token 230 having a particular secure device identifier 240 and authorization token 230 is received over a particular channel. In an embodiment, if one of these conditions is not met, secure device 210 may deny access to the firmware-locked function.

FIG. 3 depicts a flowchart illustrating a method 300 for accessing a secure device, according to some embodiments. Method 300 shall be described with reference to FIG. 1; however, method 300 is not limited to that example embodiment.

In an embodiment, secure device 110 utilizes method 300 to determine whether to grant access to a firmware-locked function. The foregoing description will describe an embodiment of the execution of method 300 with respect to secure device 110. While method 300 is described with reference to secure device 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

In an embodiment, at 310, secure device 110 updates firmware to disable public access to functions of the secure device 110. A proprietor or manufacturer may have uploaded original firmware and/or a new version of the firmware to secure device 110. This firmware, for example, may be flashed to a ROM, EPROM, EEPROM, or flash memory of secure device 110. In an embodiment, when secure device 110 updates its firmware, secure device 110 disables one or more functions, causing the one or more functions to become inaccessible to the public. This firmware-locked function may include access to the firmware, access to hidden sections of memory, and/or access to application program functions.

At 320, secure device 110 may update the firmware to provide access to the disabled or firmware-locked function in response to receiving a token corresponding to the secure device. In an embodiment, this inaccessibility may prevent a user of secure device 110 from accessing the function without providing an authorization token. In an embodiment, when updating the firmware at 310, secure device 110 may automatically update the firmware to enable certain access based on the receipt of a token. For example, firmware programming may allow for the receipt of a particular token to grant access to firmware-locked functions. In an embodiment, at 310 or at 320, secure device 110 may store a firmware program in firmware memory 116.

In an embodiment, secure device 110 may also store firmware authorization data in firmware memory 116 and/or other one-time-programmable memory. Firmware authorization data may include a token identifier that indicates which tokens may grant access to a firmware-locked function. In an embodiment, the firmware authorization data may be a device identifier indicative of secure device 110. The device identifier may be stored immutably in firmware memory 116 and/or other one-time-programmable memory. In an embodiment, secure device 110 may compare a secure device identifier 140 included within a received authorization token 130 against a device identifier encoded and/or stored in secure device 110.

In an embodiment, the firmware authorization data may be a list of acceptable tokens. In an embodiment, the token identifier may be an entry in the list that includes characteristics of acceptable tokens. For example, when secure device 110 receives a token, secure device 110 may compare attributes of the received token to the one or more token identifiers included in the list. If an attribute of the received token matches a token identifier, secure device 110 may grant access to the firmware-locked function. A token may be a data object created for and/or provided by a computing system external to secure device 110.

In an embodiment, the token identifier may be an identifying characteristic related to secure device 110. For example, secure device 110 may be associated with a serial number to distinguish a particular secure device 110 from other secure devices 110. The token identifier may be this specific serial number. When secure device 110 receives a token, secure device 110 may check the authorization data stored in firmware memory 116 to determine if the token includes the serial number as an identifier. If so, secure device 110 may grant access to the device requesting access and/or providing the token to secure device 110. In an embodiment, the token identifier and/or information stored on the token may include user identification, requestor information, an encrypted passcode and/or signature unique to secure device 110, a firmware access command to command secure device 110 to access firmware memory, other identifiers resistant to spoofing, and/or permissions available to the holder of the token.

At 330, secure device 110 may receive a token attempting to access the firmware-locked function. The token may be authorization token 130, and secure device 110 may receive authorization token 130 from access requesting device 120. At 340, secure device 110 may determine whether the received token grants authorization to the firmware-locked function based on firmware authorization data. In an embodiment, secure device 110 may analyze the received authorization token 130 to determine whether authorization token 130 includes an identifier that matches an identifier stored in the authorization data. For example, secure device 110 may determine whether authorization token 130 includes a secure device identifier 140 and/or a requestor identifier 150 that matches authorization data stored in firmware. In an embodiment, secure device 110 may examine whether other conditions are met based on information stored in secure device identifier 140. For example, secure device 110 may examine firmware version information included in secure device identifier 140 to determine if firmware version information included in an authorization token 130 matches the firmware version of secure device 110. In an embodiment, secure device 110 may also compare firmware build date information, time limits stored in secure device 110 and/or specified by authorization token 130, and/or token signature information. In an embodiment, while application programming may change, the program stored in firmware may remain static. In an embodiment, the firmware program may be hardcoded to allow authorization data to remain constant even as application program data may change.

At 350, based on an analysis of the received token and comparison with authorization data stored in firmware memory 116, secure device 110 may determine whether to allow access to a firmware-locked function. At 360, if secure device 110 determines that access is to be granted, secure device 110 may grant access to the firmware-locked function according to permissions associated with the token. In an embodiment, authorization token 130 may include an available permission identifier 160. Available permission identifier 160 may indicate the one or more firmware-locked functions available to access requesting device 120. In an embodiment, available permission identifier 160 may indicate the manner in which access requesting device 120 may interact with the firmware-locked function. For example, if the firmware-locked function includes access to an error report log, available permission identifier 160 may indicate whether access requesting device 120 is able to read the error report log, download the error report log, and/or edit the error report log.

In an embodiment, firmware memory 116 may include a mapping of permissions and/or firmware-locked functions that become available after authentication of an authorization token 130. In this embodiment, because firmware memory 116 includes permission information, secure device 110 may be able to determine allowed permissions without using available permission identifier 160 of authorization token 130. In this case, authorization token 130 may or may not include available permission identifier 160.

After granting access to the firmware-locked function, secure device 110 may also facilitate access to the firmware-locked function for access requesting device 120. In an embodiment, access may be temporary. For example, authorization token 130 may expire based on a certain time limit. In an embodiment, authorization token may be tied to a specific session established between secure device 110 and access requesting device 120. In an embodiment, when the session expires, secure device 110 may request that access requesting device 120 provide authorization token 130 again to access the firmware-locked function.

At 370, if secure device 110 in 350 determines that access is not to be granted, secure device 110 may deny access to the firmware-locked function. For example, secure device 110 may continue to prevent access and/or may notify access requesting device 120 that access has been denied. In an embodiment, secure device 110 may generate an alert to a third party system indicate that an unauthorized system has attempted to access the firmware-locked function. This alert may be a message and/or a push notification and may indicate an attempt at tampering with secure device 110. In an embodiment, in response to denying access to the firmware-locked function, secure device 110 may disable other features of secure device 110 to prevent further attempts at access. For example, secure device 110 may disable access to application programs. If a user attempting to hack or reverse engineer secure device 110 fails to access the firmware-locked function, secure device 110 may enter a security state that locks functionality to prevent further tampering. The security state may be disabled and/or access to the locked application programs may be enabled by the proprietor or manufacturer of secure device 110.

FIG. 4 depicts a flowchart illustrating a method 400 for accessing a secure device via a channel, according to some embodiments. Method 400 shall be described with reference to FIG. 2; however, method 400 is not limited to that example embodiment.

In an embodiment, secure device 210 utilizes method 400 to determine whether to grant access to a firmware-locked function via a channel communication. The foregoing description will describe an embodiment of the execution of method 400 with respect to secure device 210. While method 400 is described with reference to secure device 210, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

In an embodiment, at 410, secure device 210 may receive, over a network 270, a request attempting to access a firmware-locked function, wherein the request includes an authorization token 230. In an embodiment, access requesting device 220 may generate the request and/or transmit the request over network 270. As described with reference to FIG. 2, the request may include channel identifier 250.

At 420, secure device 210 may determine a channel identification associated with the request based on the source of the request. In an embodiment, the source of the request may be access requesting device 220. In an embodiment, secure device 210 may determine the channel identification by reading channel identifier 250 included in authorization token 230. In an embodiment, secure device 210 may determine the channel identification based on the medium through which access requesting device 220 provides authorization token 230 to secure device 210. For example, access requesting device 220 may utilize a specific API or specific subset of a broadly exposed API to communicate with secure device 210. In an embodiment, this access may indicate the usage of a specific channel utilized by access requesting device 220. In an embodiment, secure device 210 may individually assign channels to different content providers or access requesting devices 220 so that secure device 210 may determine the source of a communication based on the channel used.

At 430, secure device 210 may determine whether the channel identification matches an identification associated with the authorization token 230. In an embodiment, the channel identification refers to the determined source of the request as determined at 420. For example, the source may be access requesting device 220 and the channel identification may be a numerical value, such as "800," indicating that the request was received over channel 800. At 430, secure device 210 may retrieve an identification associated with the authorization token. This identification may be secure device identifier 240 or channel identifier 250 as presented by authorization token 230 and/or may be an identifier stored in firmware memory 216.

In an embodiment, at 430, secure device 210 may compare the channel identification with secure device identifier 240 or channel identifier 250 as presented by authorization token 230. In this embodiment, secure device 210 may determine if the device accessing the channel matches identifying information stored in authorization token 230. For example, if access requesting device 220 utilizes channel 800 to communicate with secure device 210, secure device 210 may determine that a request and/or authorization token 230 was received over channel 800. Secure device 210 may also read an identifier within authorization 230 that indicates that access requesting device 220 utilizes channel 800 or has intended to use channel 800. In this case, secure device 210 is able to determine discrepancies or spoofing if it receives an authorization token 230 indicating a channel that does not match the channel detected by secure device 210.

In an embodiment, at 430, secure device 210 may compare the channel identification with a channel identifier stored in firmware memory 216. In an embodiment, secure device 210 may not utilize information stored in authorization token 230 to determine a channel match. Instead, using the channel identification and channel assignment information stored in authorization data stored in firmware memory 216, secure device 210 may be able to determine whether the authorization token 230 was received from an authorized user of the particular channel specified in the authorization data. In an embodiment, secure device 210 may utilize this channel information to determine whether spoofing has occurred. For example, secure device 210 may detect tampering or a possible hacking attempt if the authorization token 230 is received over a channel not authorized for communications with access requesting device 220. Secure device 210 may utilize this channel information along with an identifier related to access requesting device 220 to operate as a two-tier security check. For example, to obtain access to a firmware-locked function, secure device 210 may determine that (1) the determined channel identification matches an identifier that access requesting device 220 is utilizing the channel to send a request and (2) secure device identifier 240 authorizes access to firmware-locked functions specific to the particular secure device 210 receiving the request.

In an embodiment, secure device 210 may store channel identification information in memory separate from firmware memory 216. For example, a proprietor may determine that channel information may have a lower security sensitivity level relative to a firmware program. In this manner, channel information may not be hardcoded into firmware memory 216 and may be adjustable and/or customizable as channel identifications change. In an embodiment, channel information may be stored in application memory 218.

At 440, secure device 210 determines whether the channel identification matches an identification associated with authorization token 230. If the channel identification matches, secure device may grant access to the firmware-locked function according to permissions associated with authorization token 230. If the channel identification does not match, secure device 210 may deny access to the firmware-locked function.

At 450, if secure device 210 determines that access is to be granted, secure device 210 may grant access to the firmware-locked function according to permissions associated with authorization token 230. In an embodiment, authorization token 230 may include an available permission identifier 260. Available permission identifier 260 may indicate the one or more firmware-locked functions available to access requesting device 220. In an embodiment, available permission identifier 260 may indicate the manner in which access requesting device 220 may interact with the firmware-locked function. For example, if the firmware-locked function includes access to an error report log, available permission identifier 260 may indicate whether access requesting device 220 is able to read the error report log, download the error report log, and/or edit the error report log.

In an embodiment, firmware memory 216 may include a mapping of permissions and/or firmware-locked functions that become available after authentication of an authorization token 230. In this embodiment, because firmware memory 216 includes permission information, secure device 210 may be able to determine allowed permissions without using available permission identifier 260 of authorization token 230. In this case, authorization token 230 may or may not include available permission identifier 260.

After granting access to the firmware-locked function, secure device 210 may also facilitate access to the firmware-locked function for access requesting device 220. In an embodiment, access may be temporary. For example, authorization token 230 may expire based on a certain time limit. In an embodiment, authorization token may be tied to a specific session established between secure device 210 and access requesting device 220. In an embodiment, when the session expires, secure device 210 may request that access requesting device 220 provide authorization token 230 again to access the firmware-locked function.

At 460, if secure device 210 in 440 determines that access is not to be granted, secure device 210 may deny access to the firmware-locked function. For example, secure device 210 may continue to prevent access and/or may notify access requesting device 220 that access has been denied. In an embodiment, secure device 210 may generate an alert to a third party system indicate that an unauthorized system has attempted to access the firmware-locked function. This alert may be a message and/or a push notification and may indicate an attempt at tampering with secure device 210. In an embodiment, in response to denying access to the firmware-locked function, secure device 210 may disable other features of secure device 210 to prevent further attempts at access. For example, secure device 210 may disable access to application programs. If a user attempting to hack or reverse engineer secure device 210 fails to access the firmware-locked function, secure device 210 may enter a security state that locks functionality to prevent further tampering. The security state may be disabled and/or access to the locked application programs may be enabled by the proprietor or manufacturer of secure device 210.

Figure 5:
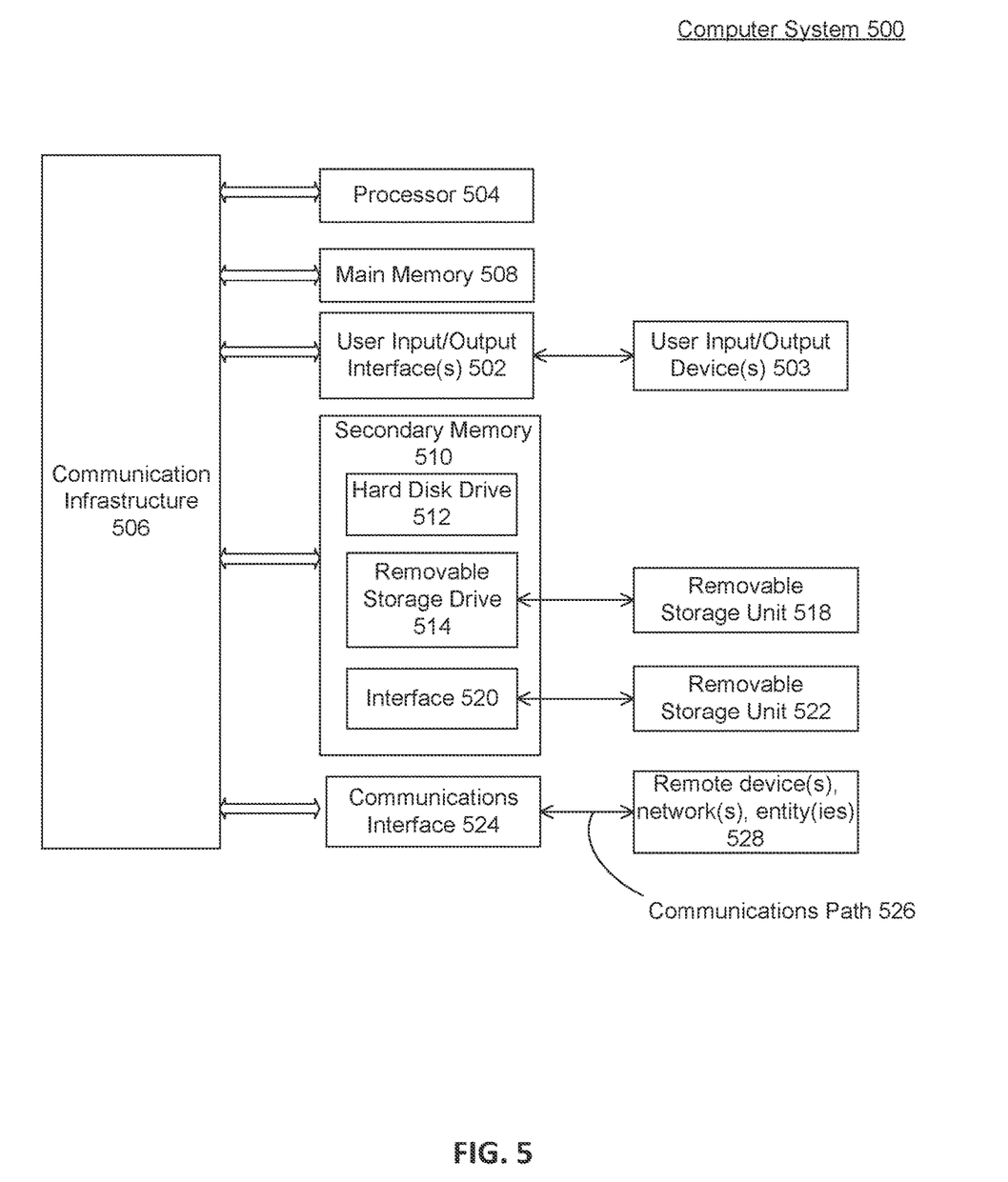
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   receiving a first request to access a firmware-locked function of a secure device, wherein the first request includes a requestor token having requestor identification data and a channel identifier indicating an authorized channel corresponding to the first request;
   in response to the receiving the first request, determining a first channel identification of the first request associated with a channel from which the first request is received by identifying a medium through which the first request is received;
   comparing the first channel identification with the channel identifier of the requestor token;
   determining that the first channel identification matches the channel identifier of the requestor token;
   retrieving authorization data stored in non-volatile memory of the secure device, wherein the authorization data includes a token identifier indicative of tokens authorized to access the firmware-locked function;
   determining that the requestor identification data of the requestor token matches the token identifier stored in the non-volatile memory;
   in response to determining that the requestor identification data matches the token identifier and determining that the first channel identification matches the channel identifier of the requestor token, enabling access to the firmware-locked function;
   receiving a second request to access the firmware-locked function, wherein the second request includes the requestor token;

determining a second channel identification indicative of a channel from which the second request was received;

determining that the second channel identification differs from the channel identifier of the requestor token by comparing the second channel identification with the channel identifier; and in response to determining that the second channel identification differs from the channel identifier of the requestor token, denying access to the firmware-locked function, wherein the first channel identification includes a first application programming interface (API) through which the first request is received, and wherein the second channel identification includes a second API through which the second request is received.

2. The computer implemented method of claim 1, further comprising:

receiving a third request to access the firmware-locked function, wherein the third request includes a second requestor token;

determining that requestor identification data of the second requestor token matches the token identifier stored in the non-volatile memory;

determining a third channel identification indicative of a channel from which the third request was received;

determining that the third channel identification differs from channel information corresponding to the second requestor token by comparing the third channel identification with the authorization data; and in response to determining that the third channel identification differs from the channel information corresponding to the second requestor token, denying access to the firmware-locked function.

3. The computer implemented method of claim 1, wherein enabling access to the firmware-locked function further comprises:

granting access to hardware peripherals of the secure device.

4. The computer implemented method of claim 1, wherein enabling access to the firmware-locked function further comprises:

allowing updated software to be uploaded to the secure device.

5. The computer implemented method of claim 4, wherein the updated software includes an operating system.

6. The computer implemented method of claim 1, wherein enabling access to the firmware-locked function further comprises:

granting access to data stored in the non-volatile memory.

7. The computer implemented method of claim 1, wherein the requestor token further comprises a permission identifier that identifies the firmware-locked function.

8. A system, comprising:

a memory, wherein the memory includes firmware and authorization data; and at least one processor coupled to the memory and configured to:

receive a first request to access a firmware-locked function of the system, wherein the first request includes a requestor token having requestor identification data and a channel identifier indicating an authorized channel corresponding to the first request;

in response to receiving the first request, determine a first channel identification of the first request associated with a channel from which the first request is received by identifying a medium through which the first request is received;

compare the first channel identification with the channel identifier of the requestor token;

determine that the first channel identification matches the channel identifier of the requestor token;

retrieve the authorization data from the memory, wherein the authorization data includes a token identifier indicative of tokens authorized to access the firmware-locked function;

determine that the requestor identification data of the requestor token matches the token identifier;

in response to determining that the requestor identification data matches the token identifier and determining that the first channel identification matches the channel identifier of the requestor token, enable access to the firmware-locked function;

receive a second request to access the firmware-locked function, wherein the second request includes the requestor token;

determine a second channel identification indicative of a channel from which the second request was received;

determine that the second channel identification differs from the channel identifier of the requestor token by comparing the second channel identification with the channel identifier; and in response to determining that the second channel identification differs from the channel identifier of the requestor token, deny access to the firmware-locked function, wherein the first channel identification includes a first application programming interface (API) through which the first request is received, and wherein the second channel identification includes a second API through which the second request is received.

9. The system of claim 8, wherein the at least one processor is further configured to:

receive a third request to access the firmware-locked function, wherein the third request includes a second requestor token;

determine that requestor identification data of the second requestor token matches the token identifier stored in the memory;

determine a third channel identification indicative of a channel from which the third request was received;

determine that the third channel identification differs from channel information corresponding to the second requestor token by comparing the third channel identification with the authorization data; and in response to determining that the third channel identification differs from the channel information corresponding to the second requestor token, deny access to the firmware-locked function.

10. The system of claim 8, wherein to enable access to the firmware-locked function, the at least one processor is further configured to:

grant access to hardware peripherals of the system.

11. The system of claim 8, wherein to enable access to the firmware-locked function, the at least one processor is further configured to:

allow updated software to be uploaded to the system.

12. The system of claim 11, wherein the updated software includes an operating system.

13. The system of claim 8, wherein to enable access to the firmware-locked function, the at least one processor is further configured to:

grant access to data stored in non-volatile memory.

14. The system of claim 8, wherein the requestor token further comprises a permission identifier that identifies the firmware-locked function.

15. A non-transitory computer-readable medium having instructions stored thereon that, when executed by at least one computing device, cause the at least one computing device to perform operations comprising:

receiving a first request to access a firmware-locked function of a secure device, wherein the first request includes a requestor token having requestor identification data and a channel identifier indicating an authorized channel corresponding to the first request;

in response to the receiving the first request, determining a first channel identification of the first request associated with a channel from which the first request is received by identifying a medium through which the first request is received;

comparing the first channel identification with the channel identifier of the requestor token;

determining that the first channel identification matches the channel identifier of the requestor token;

retrieving authorization data stored in non-volatile memory of the secure device, wherein the authorization data includes a token identifier indicative of tokens authorized to access the firmware-locked function;

determining that the requestor identification data of the requestor token matches the token identifier stored in the non-volatile memory;

in response to determining that the requestor identification data matches the token identifier and determining that the first channel identification matches the channel identifier of the requestor token, enabling access to the firmware-locked function;

receiving a second request to access the firmware-locked function, wherein the second request includes the requestor token;

determining a second channel identification indicative of a channel from which the second request was received;

determining that the second channel identification differs from the channel identifier of the requestor token by comparing the second channel identification with the channel identifier; and in response to determining that the second channel identification differs from the channel identifier of the requestor token, denying access to the firmware-locked function, wherein the first channel identification includes a first application programming interface (API) through which the first request is received, and wherein the second channel identification includes a second API through which the second request is received.

16. The non-transitory computer-readable medium of claim 15, the operations further comprising:

receiving a third request to access the firmware-locked function, wherein the third request includes a second requestor token;

determining that requestor identification data of the second requestor token matches the token identifier stored in the non-volatile memory;

determining a third channel identification indicative of a channel from which the third request was received;

determining that the third channel identification differs from channel information corresponding to the second requestor token by comparing the third channel identification with the authorization data; and in response to determining that the third channel identification differs from the channel information corresponding to the second requestor token, denying access to the firmware-locked function.

17. The non-transitory computer-readable medium of claim 15, wherein enabling the access to the firmware-locked function further comprises:

granting access to hardware peripherals of the secure device.

18. The non-transitory computer-readable medium of claim 15, wherein enabling the access to the firmware-locked function further comprises:

allowing updated software to be uploaded to the secure device.

19. The non-transitory computer-readable medium of claim 15, wherein enabling the access to the firmware-locked function further comprises:

granting access to data stored in the non-volatile memory.

20. The non-transitory computer-readable medium of claim 15, wherein the requestor token further comprises a permission identifier that identifies the firmware-locked function.

* * * * *